UNITED STATES PATENT OFFICE.

HEINRICH W. L. OTTO VON RODEN, OF HAMBURG, GERMANY.

PRESERVING MILK.

SPECIFICATION forming part of Letters Patent No. 267,043, dated November 7, 1882.

Application filed March 15, 1882. (No specimens.) Patented in England November 14, 1881, No. 4,982.

*To all whom it may concern:*

Be it known that I, HEINRICH WILHELM LUDWIG OTTO VON RODEN, a subject of the Emperor of Germany, residing at Hamburg, in the German Empire, have invented certain new and useful Improvements in Preserving Milk; and I do hereby declare that the following is a full, clear, and exact description of the invention, which will enable others skilled in the art to which it appertains to make and use the same.

Heretofore milk has been preserved either in a condensed state or by adding antiseptic chemicals. Both methods injure the taste of milk thus preserved, which can very seldom be used to replace fresh milk.

The object of my invention is to preserve milk in such a manner as not to alter its taste and to leave it in such a degree of liquidity as to allow its immediate use after opening the bottles or vessels containing such milk.

To carry my invention into effect I strain fresh milk, directly after milking, and fill it in glass bottles or other vessels, with the precaution of not filling full the entire interior of the bottle, but leaving it empty about one-sixth. Then I add some fine salad-oil, just enough to cover the surface of the milk about one-twelfth of an inch, and heat the bottles prepared in this manner about half an hour in a water bath. The heat must be regulated in such a manner as not to be less than 158° and not more than 176° Fahrenheit. Then the fire is removed and the water in the bath slowly cooled to 104°. After taking away the oil from the milk by means of a siphon or a glass syringe, or by any other convenient apparatus, the bottles are closed by good plugs, either of cork or rubber, which should be fastened with wire. Then the closed bottles are heated again in the water bath during an hour to 194° to 208° of Fahrenheit, and at last cooled in the bath to 86°.

I do not limit myself to the application of salad-oil, but any other equivalent thereof may be used which will protect the surface of the milk against the entry of air after removing the air contained in the fresh milk by heating, as above described, only the natural film of butter, which is produced in heating milk being excluded to form an object of my invention; also, any other means of heating the vessels to the mentioned degrees may be employed which will replace the water bath in a satisfactory manner.

Having thus fully described my invention, what I desire to claim and secure by Letters Patent is—

In the process of preserving milk by bottling, the method of excluding air prior to sealing, which consists in covering the milk with a film or layer of edible oil during the first heating, then removing the same, sealing, and reheating.

HEINRICH WILHELM LUDWIG OTTO VON RODEN.

Witnesses:
J. W. BAILEY,
ALEXANDER SPECHT.